United States Patent [19]

Malek

[11] Patent Number: 5,895,714
[45] Date of Patent: Apr. 20, 1999

[54] SELF-ADHESIVE PROTECTIVE FILM

[75] Inventor: Wasfi Malek, Hamburg, Germany

[73] Assignee: Beiersdorf AG, Hamburg, Germany

[21] Appl. No.: 08/701,213

[22] Filed: Aug. 21, 1996

[30] Foreign Application Priority Data

Sep. 1, 1995 [DE] Germany ............. 195 32 220

[51] Int. Cl.$^6$ ......................................... C09J 7/02
[52] U.S. Cl. .............. 428/337; 428/352; 428/353; 428/354; 428/355 EN
[58] Field of Search ...................... 428/343, 352, 428/353, 354, 355 EN, 337

[56] References Cited

U.S. PATENT DOCUMENTS

| | | | |
|---|---|---|---|
| 4,107,380 | 8/1978 | Wiesman | 428/357 |
| 4,322,516 | 3/1982 | Wiest | 526/307.7 |
| 4,585,694 | 4/1986 | Dehennau | 428/355 |
| 4,751,121 | 6/1988 | Kuhnel | 428/40 |
| 4,939,220 | 7/1990 | Mudge . | |
| 5,434,213 | 7/1995 | Chen | 524/533 |

*Primary Examiner*—Jenna Davis
*Attorney, Agent, or Firm*—Sprung Kramer Schaefer & Briscoe

[57] ABSTRACT

Self-adhesive protective film, especially for cars, characterized in that a self-adhesive composition of polyethylene vinyl acetate with a loss angle tan δ of from 0.6 to 1.0, measured at a temperature of 60° C. and a frequency of $10^{-2}$ Hz, and from 0.4 to 0.7, measured at a temperature of 60° C. and a frequency of 10 Hz, is applied to a film backing.

9 Claims, No Drawings

SELF-ADHESIVE PROTECTIVE FILM

DESCRIPTION

The invention relates to a self-adhesive protective film, preferably for protecting the finish of cars against unwanted soiling and damage during assembly and transportation.

The preservation and protection of motor vehicles in the course of transportation from manufacturer to dealer has long been common practice. It is known that, in order to preserve cars, paraffin waxes are applied in a thickness of from 5 to 20 μm. However, it has been found that, especially on horizontal areas of the vehicles, a layer which is so thin and usually non-uniform does not afford adequate protection against external influences such as, for example, the corrosive action of bird droppings. A considerable disadvantage of sealing with paraffin wax is the need to remove the preservative using a steam jet, surfactants or solvents. Environmentally sound recovery and disposal of the residues are the cause of great complexity in terms of apparatus, and very high costs.

Self-adhesive surface protection films for motor vehicles have also been known for some time. In most cases these are permanently adhesive films for protection and decoration, for example a stone-chip protective film. These self-adhesive films remain permanently on the vehicle following their application.

Reversibly self-adhesive films for protecting the car during transportation have so far been used only in a few isolated cases and without great success.

For instance, in 1977 a self-adhesive film from Beiersdorf AG, consisting of a PVC film with a cross-linked self-adhesive composition of polyacrylate and isocyanate, was used to protect the paint on the front portion of the vehicle against stone chipping and fouling by colliding insects during the running in of the car. However, this film was found to be problematic to use because the polyacrylate composition had to be cross-linked to a very high degree in order not to interact with the vehicle paint. This led to problems in use owing to inadequate adhesion of the film.

Also known are polyacrylate compositions which are not crosslinked and which after 16 hours at 80° C. show good compatibility with paint surfaces but are so soft that when the film is stripped off they leave residues of composition on the substrate. As soon as these compositions are chemically or radiation-crosslinked, they can be removed without residue but then give rise to permanent deformations on the paint surface.

Japanese Patent Application JP 02 199 184 discloses a radiation-crosslinkable pressure-sensitive adhesive which for protective use on coats of paint must be formulated with a low glass transition temperature in order to prevent permanent deformations of the paint film. In this case there are problems owing to inadequate adhesion of the self-adhesive film to motor vehicles during transportation and outdoor storage.

European Patent Application EP 0 519 278 discloses, for protecting automobiles, a sheet comprising a substrate coated with a rubber-based pressure-sensitive adhesive having a dynamic modulus of elasticity of from $2\times10^5$ to $7\times10^6$ dyn/cm$^2$, corresponding in SI units to a value of from $2\times10^4$ to $70\times10^4$ Pa, at 60° C. The adhesive can, moreover, be blended with a silicone oil or with a low molecular mass acrylic polymer. Performance tests with a self-adhesive sheet of this kind indicate relatively good compatibility with paint surfaces. The adhesive strength following storage under alternating climatic conditions on paints common in the car industry, however, is so low that the adhesive strength required in practice is not always attained. Especially under the influence of moisture on the sheet, the adhesive strength is often reduced to such an extent that the film becomes detached during transportation from the vehicle it is protecting, so that there is no longer any protective action. Furthermore, the abovementioned modulus-of-elasticity range is not a sufficient criterion for a serviceable pressure-sensitive adhesive.

The object of the invention was to remedy this situation and, in particular, to provide a self-adhesive protective film which is devoid of, or possesses only to a reduced extent, the disadvantages of the prior art.

This object is achieved by a self-adhesive protective film as characterized in more detail in the claims.

The protective film according to the invention comprises a self-adhesive protective film with a film backing coated with a self-adhesive composition of polyethylene vinyl acetate having a loss angle tan δ —depending on type and compounding—of from 0.6 to 1.0, measured at a temperature of 60° C. and a frequency of $10^{-2}$ Hz, and from 0.4 to 0.7, measured at a temperature of 60° C. and a frequency of 10 Hz. The protective film has a thickness of from 50 to 200 μm, preferably from 65 to 80 μm.

This film preferably consists of polypropylene, polyethylene or a mixture of the two components. The film has a thickness of from 10 to 100 μm, preferably from 50 to 60 μm. In a preferred embodiment, the sheet is also halogen-free. In order to improve the unrolling properties from a large roll, the film can be provided on its reverse side with a release coating.

In order to optimize its properties the self-adhesive composition can be blended with one or more additives such as rosin esters, hydrocarbon resins, paraffin oils, anti-ageing agents or elastomers, and can additionally be halogen-free.

In order to improve anchorage of the adhesive composition to the film it is possible to employ a primer.

For self-adhesive protective films it is possible to use different adhesive compositions. Most of these, however, have grave disadvantages which severely restrict their use.

A decisive parameter in developing a self-adhesive system which meets the conditions linked with the use of such protective films is the rheological behaviour of the compounded self-adhesive system. Thus the glass transition temperature, identified by a tan δ maximum, should be at temperatures from −5 to −25° C. and at the maximum should adopt almost frequency-constant values of up to 1.0 at most. This ensures excellent repositionability on the basis of a very low initial adhesive force. At temperatures above 10–30° C., preferably 20° C., tan δ is required to rise as a function of temperature. Thus at 60° C. tan δ at $10^{-2}$ Hz should be not less than 0.6 before dropping at 10 Hz to not less than 0.4. This ensures the marked rise in bond strength even within the first 30 minutes after bonding.

Known non-polar self-adhesive compositions, comprising polyacrylate and polyurethane, show better paint compatibility in a test in which they are applied for 16 hours at 80° C. to painted metal panels than polar compositions. On the other hand, however, they are too soft and leave residues of composition when the film is removed. If the compositions are crosslinked by radiation or chemically, they lead to unwanted paint-film deformation.

Self-adhesive compositions based on natural rubber resin can be removed without residue and with only very slight film deformation. However, such compositions are not stable to ageing under the effect of UV radiation.

A polyisobutylene self-adhesive composition with a loss modulus G" of G"=1.29×10⁶ dyn/cm², corresponding in SI units to a value of G"=12.9×10⁴ Pa, and a loss angle tan δ of 0.2 (both values measured at a temperature of 60° C. and at a frequency of 1 Hz) shows only very slight film deformations. However, the peel strength from the paint surface following storage under alternating climatic conditions is very low and therefore not in accordance with the application.

Unforeseeably for the person skilled in the art, a coating, on a polypropylene/polyethylene film, of a self-adhesive composition comprising polyethylene vinyl acetate with a loss angle tan δ of from 0.6 to 1.0, measured at a temperature of 60° C. and a frequency of $10^{-2}$ Hz, and from 0.4 to 0.7, measured at a temperature of 60° C. and a frequency of 10 Hz, has the properties sought. Especially on a 50 μm thick polypropylene/polyethylene film where the two polymers are employed in a ratio of from 9:1 to 1:9, preferably 4:6, and which has an initial coat of polyethylene vinyl acetate, the self-adhesive composition according to the invention shows no paint-film deformation after storage for 16 hours at 80° C. on metal panels which have been coated with polyurethane varnish and dried at 130° C.

The peel strength of the protective film according to the invention from various substrates is at the level, conforming to practical requirements, of from 2 to 5 N/cm. In addition, irradiation of the protective film with UV light, for example with a 500 W UV lamp with a sunlight spectrum over 5 days, leads to no detectable impairment in the properties of the protective film. There is no embrittlement, and neither does the self-adhesive composition cause paint-film deformation nor do residues of composition occur when the protective film is removed.

In addition to this, the protective film according to the invention is distinguished in that it can be applied in a large width over the bonnet, roof and boot of the car and, owing to its flexibility, adapts very well to planar and gently rounded surfaces. It is thereby possible to protect the horizontal surfaces which are most at risk from soiling. However, narrow areas such as, for example, the projection of the door below the windows can easily be covered over. Protection of the vertical surfaces on the vehicle is particularly appropriate during its assembly.

On the one hand, the self-adhesive composition exhibits good adhesion to various stoving enamels common in the automotive industry, even under the influence of moisture or humidity, so that the protective film is not detached from the vehicle even under the action of wind; on the other hand, its low initial adhesive force makes it reversibly adhesive, so that it is possible during application to correct the position of the protective film on the vehicle. In addition to this, the self-adhesive composition shows a distinct rise in bond strength even with low initial adhesive power and within the first 30 minutes after bonding.

The protective film is resistant to sunlight, moisture, heat and cold, with weather stability of up to half a year.

After application of the protective film and following storage for 16 hours at 80° C. and under the effect of weathering, the self-adhesive composition does not give rise to any deformation of the underlying paint film. In addition, the uniform overall thickness of the protective film ensures, in comparison to preservation with wax, flawless protection against soiling and damage of the whole vehicle.

Following use, the protective film can be removed without residue and without tearing the backing film in spite of the required, good adhesive strength. Since the protective film is halogen-free, material recycling thereof or energy recovery therefrom is readily possible.

In the text which follows the invention will be illustrated on the basis of examples which are not, however, intended unnecessarily to restrict the invention.

EXAMPLES

Example 1

A self-adhesive composition comprising polyethylene vinyl acetate dissolved in toluene in a proportion of 15%, which has a vinyl acetate content of 45% by weight and a loss angle tan δ of 0.8 measured at a temperature of 60° C. and a frequency of $10^{-2}$ Hz, is applied at a rate of 15 g/m² in a coating unit with coating bars and a drying tunnel to a 50 μm thick, 1450 mm wide white film which is corona-pretreated on both sides and is provided with carbamate varnish and with an EVA initial coat, the film consisting of 90% polypropylene and 10% polyethylene. The drying temperature is from 60 to 100° C. with a residence time of 3 minutes. At the end of the tunnel, the coated backing web is cut at the edges and wound up to form bars with a length of 66 m and a width of 1400 mm.

The self-adhesive film produced in this way can when used to protect cars be unrolled without creases, applied without problems and removed again after use without defects.

The material is characterized by the following physical properties:

Overall thickness of protective film: 65 μm Peel strength from the PU varnish after storage for 16 hours at 80° C., at a peel angle of less than 90° and a peel rate of 300 mm/min: 3.8 N/cm Peel force from the reverse side at a peel angle of less than 90° and a peel rate of 300 mm/min: 0.5 N/cm The measurements were carried out with an instrument from Rheometric Scientific under deformation-constant conditions.

Example 2

With reference to Example 1, 90% by weight of polyethylene vinyl acetate with a vinyl acetate content of 45% by weight and a loss angle tan δ of 0.78 (60° C. and $10^{-2}$ Hz) and 10% by weight of rosin ester with a softening point of 85° C. are first of all mixed, the mixture is dissolved in toluene in a proportion of 15% and the solution is applied in accordance with Example 1 at a rate of 12 g/m² to a film consisting 80% of polypropylene and 20% of polyethylene.

The material is characterized by the following physical properties:

| | |
|---|---|
| Overall thickness of protective film: | 63 μm |
| Peel strength from the PU varnish after storage for 16 hours at 80° C., at a peel angle of less than 90° and a peel rate of 300 mm/min: | 3.1 N/cm |
| Peel force from the reverse side at a peel angle of less than 90°and a peel rate of 300 mm/min: | 0.4 N/cm |

Example 3

A self-adhesive composition of polyethylene vinyl acetate with a vinyl acetate content of 45% by weight and a loss angle tan δ of 0.6 (60° C. and 10 Hz) is coextruded at from 160 to 170° C. in an extruder with a slot die with a layer of the film known from Example 1 in a width of 1700 mm, the rate of application of the self-adhesive composition being 15 g/m². The film receives a thickness of 52 μm. The composite film is then cut into rolls with a length of 66 m and a width of 1500 mm.

The material is characterized by the following physical properties:

| | |
|---|---|
| Overall thickness of protective film: | 67 μm |
| Peel strength from the PU varnish after storage for 16 hours at 80° C., at a peel angle of less than 90° and a peel rate of 300 mm/min: | 3.2 N/cm |
| Peel force from the reverse side at a peel angle of less than 90° and a peel rate of 300 mm/min: | 0.5 N/cm |

Example 4

With reference to Example 3, 90% by weight of polyethylene vinyl acetate with a vinyl acetate content of 45% by weight and a loss angle tan δ of 0.58 (60° C. and 10 Hz) and 10% by weight of rosin ester with a softening point of 85° C. are first of all mixed and coextruded in accordance with Example 3 together with the film known from Example 1, the application rate of the self-adhesive composition being 19 g/m². The film receives a thickness of 61 μm.

The material is characterized by the following physical properties:

| | |
|---|---|
| Overall thickness of protective film: | 80 μm |
| Peel strength from the PU varnish after storage for 16 hours at 80° C., at a peel angle of less than 90° and a peel rate of 300 mm/min: | 2.8 N/cm |
| Peel force from the reverse side at a peel angle of less than 90° and a peel rate of 300 mm/min: | 0.8 N/cm |

I claim:

1. Self-adhesive protective film comprising a self-adhesive composition of a polymer having units consisting of ethylene and vinyl acetate with a loss angle tan δ of from 0.6 to 1.0, measured at a temperature of 60° C. and a frequency of $10^{-2}$ Hz, and from 0.4 to 0.7, measured at a temperature of 60° C. and a frequency of 10 Hz, applied to a film backing.

2. Self-adhesive protective film according to claim 1, characterized in that the protective film has a thickness of from 50 to 200 μm.

3. Self-adhesive protective film according to claim 1, characterized in that the film consists of polypropylene or polyethylene or a mixture of the two components.

4. Self-adhesive protective film according to claim 1, characterized in that the film has a thickness of from 10 to 100 μm.

5. Self-adhesive protective film according to claim 1, characterized in that the film is halogen-free.

6. Self-adhesive protective film according to claim 1, characterized in that the film is provided on the reverse side with a release coating.

7. Self-adhesive protective film according to claim 1, characterized in that the self-adhesive composition is blended with one or more additives selected from the group consisting of rosin esters, hydrocarbon resins, paraffin oils, anti-ageing agents and elastomers.

8. Self-adhesive protective film according to claim 1, characterized in that the self-adhesive composition is halogen-free.

9. Self-adhesive protective film according to claim 1, characterized in that a primer is employed between film and self-adhesive composition.

* * * * *